June 29, 1965   J. W. BAYNHAM ETAL   3,192,034
MANUFACTURE OF GRANULAR FERTILIZERS
Filed July 2, 1962
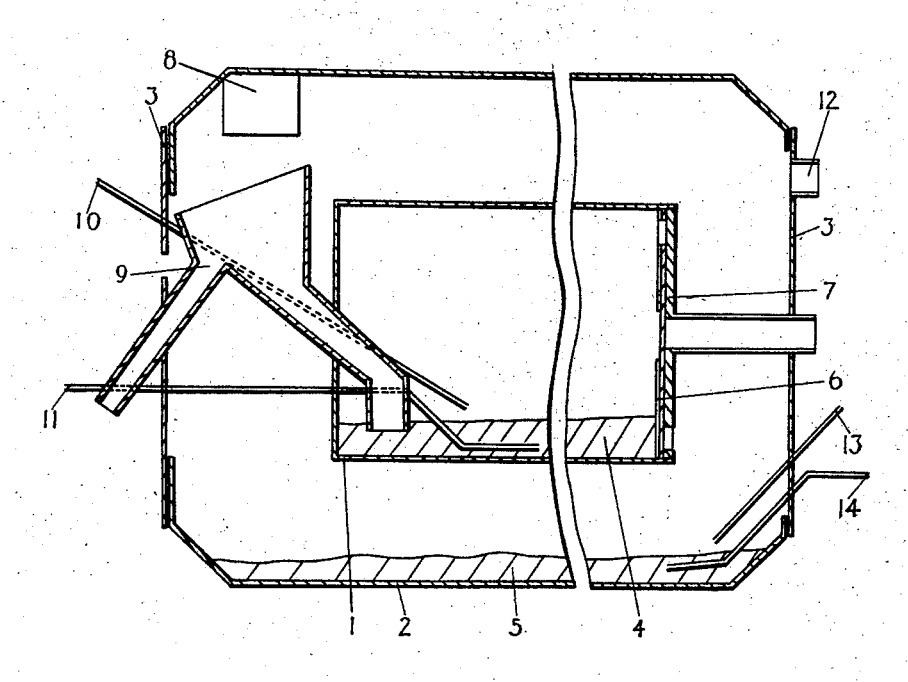
INVENTOR
JOHN WILLIAM BAYNHAM
FREDERICK JOHN HARRIS
BY *Cushman, Darby & Cushman*
ATTORNEYS

United States Patent Office 3,192,034
Patented June 29, 1965

3,192,034
MANUFACTURE OF GRANULAR FERTILIZERS
John William Baynham and Frederick John Harris, Leith, Edinburgh, Scotland, assignors to Scottish Agricultural Industries Limited, Edinburgh, Scotland, a corporation of Great Britain
Filed July 2, 1962, Ser. No. 206,622
Claims priority, application Great Britain, July 14, 1961, 25,585/61
4 Claims. (Cl. 71—64)

The present invention relates to a process of manufacturing granular fertilizers, in particular, ammonium phosphate granular fertilizers having an N:P ratio between 1.4 and 2.2.

The value of a fertilizer depends upon its content of plant nutrient elements, particularly nitrogen, phosphorus and potassium. The plant nutrient contents of a mixed fertilizer are expressed in terms of N, $P_2O_5$ and $K_2O$, and are represented by a set of figures which refer to the percentages by weight respectively of these nutrients. The $P_2O_5$ is usually in the form of a phosphate which is soluble in water or ammonium citrate solution.

One such water-soluble phosphate is diammonium phosphate $(NH_4)_2HPO_4$, which contains 53.7% $P_2O_5$ and 21.20% N, thereby making it a relatively highly concentrated fertilizer material. However, there are certain technical difficulties in manufacturing fertilizers containing diammonium phosphate as the only source of $P_2O_5$ and it is usual for the phosphatic component to be a mixture of monoammonium phosphate, $NH_4H_2PO_4$, and diammonium phosphate. In such ammonium phosphate the ratio of nitrogen atoms to phosphorus atoms will be between 1 and 2: this ratio is generally termed the N:P ratio.

The production of granular fertilizers containing ammonium phosphate of high N:P ratio (>1.4) is difficult because of the thermal instability of the diammonium phosphate. In a conventional process of manufacturing a mixed fertilizer the components are first granulated together with the addition of water; this water has to be subsequently removed to give a "dry" product. The term "dry" is used herein to describe a product, the moisture content of which is below the level, usually $\approx$0.5% $H_2O$, but dependent upon the composition, at which caking in storage is a serious hazard. The granules are then dried in a hot gas stream, the gas serving both as a carrier of heat to the granules to evaporate the water therefrom and as a means of carrying off the evaporated water. This form of drying requires a considerable volume of gas which may carry off large quantities of ammonia which is formed by the decomposition of the diammonium phosphate: this ammonia loss is undesirable because the loss can only be recovered by costly gas scrubbing systems.

In addition to the difficulties of manufacturing a dry, granular fertilizer containing ammonium phosphate of N:P>1.4, if the fertilizer also contains another heat sensitive or a highly soluble ingredient, e.g. urea or ammonium nitrate, there is a further tendency to decomposition and/or softening during any heat treatment or drying operation.

We have now found that by modifying the process of manufacturing fertilizers containing an ammonium salt as claimed in co-pending cognate British patent applications. Nos. 38,993/60 and 10,454/61 (U.S.A. patent application No. 152,265, filed November 14, 1961, now abandoned) we can manufacture in an improved manner dry, granular fertilizers containing ammonium phosphate of N:P>1.4 and also, if desired, ammonium nitrate or like heat sensitive, highly soluble materials.

In said co-pending applications there is claimed inter alia a process (hereinafter referred to as the "Internal Recirculation" process) which comprises adding at such a rate ammonia and at least one acid which reacts exothermally with ammonia to a localised region of a stream of granules having substantially the composition of the final product and undergoing recirculation while flowing also at such a rate that the heat of reaction between the ammonia and acid permits the temperature and the moisture content throughout the stream to be such that the granules do not lose their discrete identities, and removing from the recirculating stream a granular product in an amount substantially equivalent to the acid and ammonia added from a region remote from said localised region in the direction of flow of the stream and where said granular product is of required moisture content.

There is also claimed therein a process wherein in said localised region the granules are first treated with acid and the acidified granules are then ammoniated.

The object of the present invention is to modify this "Internal Recirculation" process to permit he manufacture in an improved manner of dry fertilizer granules containing ammonium phosphate of N:P>1.4 by subjecting the circulating granules to at least two stages of differing conditions, firstly, immediately after phosphoric acid treatment, to an ammoniation stage, and secondly to a stage for the removal of the water vapour evaporated by the heat of reaction.

According to the present invention the process for the production of a granular fertilizer comprising ammonium phosphate, particularly of N:P ratio between 1.4 and 2.2, comprises recirculating granules of said fertilizer in a continuous stream through at least two regions so that in the first region the granules are treated with phosphoric acid and then with ammonia, the partial pressure of the ammonia in said first region being higher than the ammonia pressure caused by the decomposition of the said ammonium phospate at the working temperature, and in the second region the gaseous atmosphere therein is treated with a current of a gas of volume sufficient to remove, at the rate of recirculation, the water evaporated from the granules in the first region and insufficient to remove any substantial quantity of ammonia, the rate of circulation through the two regions being also such that in the first region the ammonia has sufficient time to react with the phosphoric acid to form ammonium phosphate of the desired N:P ratio, and removing from the recirculating stream in a region removed from the first region a granular product in an amount substantially equivalent to the phosphoric acid and ammonia added in the first region and of the required moisture content.

To obtain a dry product, there is a lower limit to the concentration of the phosphoric acid which can be used, the limiting concentration being that below which more water is introduced to the system than can be adequately evaporated by the heat of reaction of the phosphoric acid and ammonia.

If desired, other acids may be used in addition to the phosphoric acid. These acids will contribute additional heat by reaction with ammonia. This heat can also be utilised to dry the product. Examples of such acids are nitric acid and sulphuric acid. The lower limits of the concentrations of these additional acids are also governed by the amount of water introduced thereby if these acids may be introduced with the phosphoric acid in the first region. These additional acids, can, if desired, be introdced and further, if desired, ammoniated in regions in the recirculating stream outside the aforesaid two regions.

Unless very concentrated acids are used, substantially anhydrous ammonia is preferred. However, aqueous ammonia solution may be used so long as the total water introduced is less than that which can be adequately evaporated by the heat of reaction.

Any other fertilizer salt or additive, such as urea or potassium salts to give a desired composition may be added concurrently with the acid and ammonia to the continuous stream of granules. Moreover, other substances such as pesticides or fungicides can be incorporated so long as they are stable under the mild reaction conditions of the process of the invention.

During the ammoniation stage, i.e. in the first region, the recirculating stream of granules may be passed through a closed vessel, i.e., an ammoniator, preferably substantially sealed by the stream of granules entering and leaving the vessel, so that the only gas, other than moisture and ammonia, which passes through the vessel is that entrained in the granule stream. The heat of reaction is sufficient to evaporate most of the water from the layer of reactants on the surface of the granules. Because the partial pressure of ammonia in the ammoniator is greater than the ammonia pressure caused by the decomposition of diammonium phosphate at the working temperature, no decomposition should occur at this stage.

It is preferable, if there is any passage of gas through the ammoniating vessel, that this should be co-current with the stream of recirculating granules.

It has been found that in the operation of the process on an adequately large scale the ammoniation stage need not occupy the whole length of the ammoniating vessel and therefore it is possible to utilise limited co-current draughting in said vessel to remove more water vapour than that carried away by the gas inevitably entrained in the granule stream.

In the stage following the ammoniation stage, only sufficient gas is passed over the recirculating stream of granules to remove the water vapour evaporated in the ammoniation stage. This gas may carry some ammonia off but far less than is normally carried off if a conventional drying operation is employed, in which the gas acts as a carrier of heat and a much greater volume is used than is necessary just to remove the water vapour under conditions of near saturation of the gas with water vapour.

It is preferable to pass the gas for the removal of water vapour counter-currently to the granule stream in order to remove the water vapour in the most efficient manner.

The controlled passage of gas in the second stage of the process of our invention is also important because, thereby, the granule temperature may be controlled.

Another important feature of the process is that the rate of addition of the ammonia and acid, and hence the rate of removal of the granular product, is controlled relative to the rate of recirculation of the granules. It is highly desirable that the rate of recirculation of the granule stream relative to the rate of addition of the reactants be sufficiently fast to cause the formation of only thin skins of acid on each granule. Such thin skins of acid are conducive to quick and efficient reaction and moisture evolution. The ratio of the rate of recirculation of the granules to the rate of removal of granular product is preferably at least 20:1 and, particularly for large scale operation, is preferably between 30:1 and 80:1. If the recirculation rate is too slow relative to the rate of addition of reactants, the granules will lose their discrete identities and agglomerate into undesirable oversize particles. This is liable to occur if the moisture content of the recirculating stream of granules at any given point becomes excessive. In the aforementioned co-pending applications examples have been given of the maximum permissible moisture contents in the localised region at given temperatures for several chemical formulations of product. Similar dependence of the maximum permissible moisture content of the first region upon chemical composition and temperature exists in the process of the present invention. Examples of these relationships are given in the table below.

| Material being granulated | Percent $H_2O$ in product | Average percent $H_2O$ in first region | Average temperature of first region (° C.) | Ratio of rate of recirculation of granules to rate of removal of granular product |
|---|---|---|---|---|
| Fertilizer ammonium phosphate (N:P=1.6) | 0.75 | 1.05 | 100 | 80.1 |
| 24% fertilizer ammonium phosphate (N:P=1.6), 56% ammonium nitrate, 20% muriate of potash | 0.38 | 0.48 | 88 | 55.1 |

Preferably the moisture content of the granules in said first region is at least 0.1% less than that at which the granules tend to lose their discrete identities at the temperature of said first region. On the other hand the rate of recirculation is too fast if the residence time in the first region is too short to allow the ammoniation to proceed to the desired level or if the residence time in the water-removal second region is too short so that the granule stream entering the first region is not dry.

Another feature of the invention is that the heat used to evaporate the water is generated where it is required and no heat transfer from a gas to solid phase is necessary. In this way the heat formed is used to its best advantage and possibility of local over-heating is minimised. This is of special importance when the process is applied to the manufacture of granular fertilizers containing a heat-sensitive component in addition to the heat-sensitive compound diammonium phosphate. Control over the temperature of the granule stream within fine limits is attainable for long periods since the large heat reservoir of the granule stream acts as a damper to thermal fluctuations.

In order to maintain stable running conditions, a fraction of the circulating stream of granules is extracted from the recirculation system. From this fraction the required end-product, screened out in any desired size range, is removed in amount equivalent to the new fertilizer solids formed. Any oversize is cracked, screened if desired, and the non-product size returned to the reactor with the fines, thus providing new nuclei for granulation. Due to abrasion, for instance, a proportion of the granular product may break down to produce new nuclei for granulation.

In an embodiment to our invention the process is used to manufacture granular mixed fertilizers based on ammonium phosphate of N:P>1.4, ammonium nitrate and potassium chloride, to give an $N:P_2O_5:K_2O$ composition. Two acids are used, phosphoric and nitric acids, and it is preferred to add these separately to the recirculating stream of granules. The phosphoric acid is added at the beginning of the ammoniation stage in which the N:P ratio is raised to the desired level. The nitric acid is added and subsequently neutralised with ammonia during or following the removal of water vapour stage.

In order to reduce its reaction with the nitric acid, potassium chloride is preferably added just before the stage in which the phosphoric acid is added and ammoniated.

The addition of the nitric acid during the water removal stage is preferable because a close control can be kept of the granule temperature by the amount of gas used in this stage. This obviates the difficulties normally associated with ammonium nitrate-based compositions, viz. thermal decomposition and oversize formation due to softening of the granules.

A simple form of reactor which can be used for carrying out the process of the invention is one claimed in co-pending British application No. 9638/60 (U.S.A.

patent application No. 96,590, now Patent No. 3,097,833) and is diagrammatically represented by FIGURE 1.

In the reactor one drum 1, is concentrically mounted inside another drum 2, having stationary end plates 3. Each drum contains a bed of preformed granules, 4 and 5 respectively. On rotation of the reactor the granules pass along the inner drum 1, are discharged into the outer drum 2, through holes in the end plate 6, of the inner drum and in the stationary baffle plate 7, intermittently coincident below the surface of the bed. The granules are passed along the outer drum 2, are picked up by buckets 8, and are discharged down a bifurcated chute 9, into the inner drum 1.

The inner drum 1 is effectively sealed by the stream of granules passing in and out of it and so has the conditions for the maintenance of the required partial pressure of ammonia. Phosphoric acid is added through pipe 10 on to the bed 4, and ammonia is added through pipe 11. The only gas passing through the inner drum 1 is that entrained in the granule stream and a fraction of the water vapour is removed by this gas. The major water vapour removal zone is provided in the outer drum 2, the wet gas being drawn off through vent 12.

If desired, nitric acid and ammonia are added through pipes 13 and 14 respectively.

The product is extracted through one of the bifurcations in the chute 9.

The process of the invention may also be performed in certain embodiments of the invention claimed in copending British application No. 38,378/61 (U.S.A. patent application No. 188,766) wherein the solids exit end of the inner drum comprises a lip retaining a desired depth of granules in said drum and wherein it is possible to control and, if necessary, substantially to eliminate draughting in said inner drum by variable sealing of the solids inlet end of said drum.

Equipment for the process of the invention should permit the following essentials of the process to be carried out:

(a) The stream of granules should circulate at such a rate that at least most of hte granules remain discrete and free-flowing at all stages and are ammoniated to the desired level.

(b) The circulating stream should pass through an ammoniating zone in which the partial pressure of ammonia of the gaseous atmosphere therein is greater than that associated with the decomposition of diammonium phosphate at the working temperature.

(c) The ammoniating stage should be followed by a water-removal stage in which the granule stream is subjected to a controlled amount of gas to remove the water vapour and to maintain the temperature of the granule stream at a desired level.

The process of the invention is illustrated by the following examples.

*Example 1*

A complete granular fertilizer (containing 23% N, 11½% $P_2O_5$ and 11½% $K_2O$) based on ammonium nitrate and ammonium phosphate (N:P$\approx$1.6) and potassium chloride is produced in the following manner in the reactor previously described and illustrated in FIGURE 1. Phosphoric acid and the requisite amount of ammonia are fed into the inner drum 1, and nitric acid and ammonia are introduced to the bed of the previously prepared fertilizer of the aforesaid composition close to the discharge from drum 1. Potassium chloride is fed onto the bed in the outer drum at a reasonable distance beyond the points of nitric acid and ammonia introduction. The recirculating bed has a retention time in the inner drum sufficient to result in ammoniation of phosphoric acid to N:P$\approx$1.6 and the recirculation rate of solids is such that the dew point of the atmosphere in the inner drum never exceeds the working temperature. The sufficiency of the ammonia vapour pressure in the ammoniation region of the inner drum is checked by regular estimation of the N:P ratio of the material from said inner drum.

The operation conditions are as follows:
Strength of phosphoric acid _____ 50% $P_2O_5$.
Strength of nitric acid _____ 80% $HNO_3$.
Rate of addition of phosphoric acid ___ 21 lb./hr.
Rate of addition of nitric acid _____ 49 lb./hr.
Rate of addition of potassium chloride _ 17.5 lb./hr.
Operating temperature _____ 85° C.
Dew point in inner drum 1 _____ 80° C.
Rate of granule recirculation _____ 11,000 lb./hr.
Production rate _____ 90 lb./hr.
Size of product _____ 5–12 mesh B.S.S.
Moisture content of product _____ 0.2% $H_2O$.

*Example 2*

The reactor previously described and illustrated in FIGURE 1, modified to allow the introduction of further air, is used to produce fertilizer diammonium phosphate (containing 17.6% N and 48% $P_2O_5$: N:P$\approx$1.60). Wet-process phosphoric acid and the requisite amount of ammonia are fed into the inner drum 1 through pipes 10 and 11 respectively so that the phosphoric acid coats granules of previously prepared fertilizer diammonium phosphate in the bed 4, and these granules are then ammoniated by passing ammonia into the said granule bed at a point beyond that at which the acid is added in the direction of flow of the granule bed. A small volume of air, in addition to that entrained with the granules, is passed through drum 1 co-current with the stream of granules and a much greater volume of air is passed through drum 2 counter-current to the stream of granules.

The operation conditions are as follows:
Strength of phosphoric acid _____ 46.3% $P_2O_5$.
Rate of addition of phosphoric acid ___ 92.6 lb./hr.
Operating temperature in inner drum 1__ 92° C.
Rate of granule recirculation _____ 10,110 lb./hr.
Production rate _____ 87.6 lb./hr.
Size of product _____ 5–12 mesh B.S.S.
Moisture content of product _____ 0.11% $H_2O$.
p$NH_3$ in inner drum 1 _____ 27 mm. Hg.
p$H_2O$ in inner drum 1 _____ 484 mm. Hg.
p air in inner drum 1 _____ 247 mm. Hg.
Volume of entrained air in inner drum
 1 (92° C.) _____ 101 ft.³/hr.
Volume of extra air added to inner drum
 1 (92° C.) _____ 85 ft.³/hr.
Total volume of gas ex inner drum
 1 (92° C.) _____ 572 ft.³/hr.
Percent water removal in inner drum 1 60%.
Volume of air through outer drum
 2 (90° C.) _____ 6,000 ft.³/hr.
Percent water removed in outer drum 2 40%.

What we claim is:
1. A continuous process for the production of a multi-layered granular ammonium phosphate fertilizer of an N:P ratio between 1.4 and 2.2, which comprises providing quantities of phosphoric acid and ammonia, reacting said quantities of phosphoric acid and ammonia on granules of ammonium phosphate in a first region of a reaction chamber while maintaining the partial pressure of the ammonia therein at a level higher than the ammonia pressure generated by any decomposition of said ammonium phosphate granules, passing said granules to a second region in said reaction chamber and treating same therein with a current of air of a volume sufficient to remove any water vaporized and carried over from said first region and insufficient to remove any significant quantity of ammonia thereby maintaining the moisture content of said granules at a level below about 1% and forming a layer of ammonium phosphate on each of said granules, withdrawing said granules from said second region of said reaction chamber, removing a portion of said granules from said second region and in an amount substantially equivalent to the acid and ammonia being aded to said chamber, recirculating the remainder of said granules to said first region inside the chamber while maintaining the moisture content of the same at a level below 1%, the ratio of the rate of recirculation to the rate of removal being at least 20:1, reacting an additional quantity of phosphoric acid and ammonia on said recirculated granules while continuing to maintain the partial pressure of the ammonia therein higher than the ammonia pressure generated by any decomposition of said recirculated ammonium phosphate granules, effecting conditions favorable to the maintenance of said partial pressure by sealing said first region with said recirculated granules as they enter said first region, passing said recirculated granules to said second region in said reaction chamber and treating same with a curent of air of a volume sufficient to remove any water vaporized and carried over from said first region and insufficient to remove any significant quantity of ammonia thereby maintaining the moisture content of said recirculated granules at a level below 1% and forming a further layer of ammonium phosphate thereon, and repeating said removal and recirculation cycle to thereby obtain a multi-layer granular ammonium phosphate fertilizer as the end product.

2. A process as claimed in claim 1 wherein the ammonia is anhydrous.

3. A process as claimed in claim 1 wherein at least one acid is used in addition to the phosphoric acid.

4. A process as claimed in claim 1 wherein the recirculating of the granules is effected in a single reactor.

References Cited by the Examiner

UNITED STATES PATENTS

| | | | |
|---|---|---|---|
| Re. 19,750 | 11/35 | Billings et al. | 23—313 |
| 2,600,253 | 6/52 | Lutz | 71—43 |
| 2,618,547 | 11/52 | Davenport et al. | 71—43 |
| 2,860,598 | 11/58 | Loesche | 71—64 |
| 2,946,666 | 7/60 | Eymann | 71—43 |
| 2,965,471 | 12/60 | Stassfort | 71—43 |
| 3,011,875 | 12/61 | Seemner | 71—43 |
| 3,097,833 | 7/63 | Harris et al. | 23—286 |

DONALL H. SYLVESTER, *Primary Examiner.*

ANTHONY SCIAMANNA, *Examiner.*